Patented Oct. 29, 1940

2,220,047

UNITED STATES PATENT OFFICE 2,220,047

HEAT TREATMENT PRODUCTION OF VEGETABLE FIBER PRODUCTS

William H. Mason, Laurel, Miss., assignor to Masonite Corporation, Laurel, Miss., a corporation of Delaware No Drawing. Application August 19, 1933, Serial No. 685,967. Renewed March 23, 1940

2 Claims. (Cl. 92—61)

The present invention has for its principal object the obtaining of substantially maximum bonding effect from the natural constitutents of ligno-cellulose fiber, and particularly the production of a ligno-cellulose fiber board or other product, given very high, stiffness, dry and wet strength and resistance to water absorption by high temperature heat-treatment.

When hard boards of ligno-cellulose fiber are made by drying wet fiber sheets in a hot platen press under sustained consolidating pressure, unless the pressure is kept relatively low, there is practically a maximum of about 375° F. for the temperature applied for expelling water and steam, even when wire mesh is interposed to provide outlets therefor. Materially higher temperatures, applied while moisture is present in material proportions, are not merely less economical in practice, but often detrimental to the quality and appearance of the product.

I have discovered that application to hard boards of ligno-cellulose fiber which have been so made under heat and compacting pressure of a temperature over 425° F., preferably 425° F. to 550° F., without pressure, will give a very great increase in dry and wet strength, stiffness and resistance to water absorption. The effects produced are indicative of substantially maximum bonding of the fibers by their natural constituents and of the possibility that reaction occurs at such high temperature by which additional bonding material is formed, or the bonding material present is converted into bonding material of increased strength and water resistance. Formation or completion of formation of a phenolic type condensation or polymerization product or products within the board as a result of the application of the high temperature could account for the notable increase in dry and wet strength and in resistance to water absorption in view of the known qualities of such products.

With the preferred embodiment of my invention, I apply this discovery to secure a material increase in such valuable properties, and at the same time to avoid defects that would often result from application of such high temperatures to bodies of wet fiber, by first drying or substantially drying the sheet under sustained consolidating pressure at the relatively lower temperatures at which getting a defective product can be ordinarily avoided, and thereafter applying such high temperature heat-treatment to the dry or substantially dry sheet.

The fiber furnish used should contain the cellulose and a large percentage, preferably substantially all, of the non-cellulose (or lignins) of natural ligno-cellulose fiber. In the claims I refer to non-cellulose constituent of ligno-cellulose fiber as natural fiber encrustation. This is not only on account of greater yield and relatively lower cost obtained, but essentially because self-bonding properties, high dry and wet strength, and high resistance to absorption of water are present to the greatest extent in the products made of altogether raw ligno-cellulose fiber, i. e. fiber containing all the non-cellulose constituents, and present to a considerable extent when the fiber is partly raw. A fiber mass containing the natural fiber encrustants and other constituents of ligno-cellulose fiber may be cheaply and easily obtained by subjecting fibrous vegetable growths of wood or woody nature, such as trees, bamboo, straw, cornstalks, grasses, canes (bagasse), sedges and the like to known processes of fibration whereby the wood or woody material is separated into fibers and small bundles of fibers, without undue loss of lignins on non-cellulose constituents of the fiber, such as exploding, or grinding, or cooking and shredding the material. I prefer to use wood of trees and prefer a ligno-cellulose fiber made to contain substantially all the natural fiber constituents by cutting the tree wood into chips and exploding the chips with high pressure steam, followed by moderate beating of the pulp comprising such fiber.

Extraneous binders are not needed, and preferably are entirely dispensed with, but if desired can be incorporated, as by introduction thereof into the water bath or by impregnation and baking of a pressed sheet or otherwise.

I preferably incorporate waterproofing size, especially when the highest resistance to water absorption is desired. In using hydrocarbon size, such as petrolatum, for example, molten petrolatum, to the extent of around 1% to 5% of the weight of the dry fiber, preferably about 2%, may be incorporated with the pulp in the water bath or stock chest, and the temperature therein held above the melting point of the size. Other waterproofing sizes, such as rosin size, for example, may be used with suitable fixing agents, and the waterproofing agent may be emulsified and introduced cold, if desired, or in yet other ways.

Light porous wetlap sheets of the fiber mass are preferably first formed from the water bath, and are made into dry or substantially dry sheets or boards by application of temperature of about 315° F.–375° F. under consolidating, sustained pressure in a heated platen press with a wire mesh in place between the wet-lap and a platen, the consolidating pressure applied being preferably such as to produce a sheet or blank of specific gravity of .8 or higher, preferably 1 or higher.

My high temperature heat-treatment is applied without pressure to boards or blanks made as just described or in other ways. Such heat treatment without pressure is desirable from the standpoint of economy since no cost of pressing is involved and the boards or blanks to be treated do not need to be bone dry, but may contain some moisture absorbed from the atmosphere or otherwise present.

The boards or blanks can be heat-treated in accordance with my invention which dispenses with use of pressure while applying high heat, by being caused to pass, for example, through a tunnel or oven on a conveyor. Economy is promoted by taking the blanks hot from the forming press, but such step may be separated from the high temperature heat-treatment step by any preferred time period. In the oven or other heating chamber the boards move in contact with a current, preferably countercurrent, of air kept at or above an apparently critical temperature of about 425° F., preferably 425° to 550° F. The temperature at the end where the board enters the oven may, for example, be 460° F. and at exit end 500° F. The time occupied by the board in passing through the heating oven must not be long enough to cause burning or charring of the board, and varies with the thickness of the board and the temperature, 5 to 7 minutes, for example, giving good results with boards of specific gravity about 1 and 1/8" thick, and from 10 to 15 minutes for boards of 1/4" thickness. If the temperature is increased, the time may be decreased and vice versa, so long as heat absorption and conduction are so balanced that the board is heat-treated practically uniformly throughout its thickness, without undue scorching or charring.

In carrying out the heat-treatment of such blanks without application of pressure, the specific gravity and thickness of the finished product of course remain substantially unchanged. Very marked increase in dry and wet strength and stiffness and resistance to water absorption are obtained. This increase is considered to be due to increased activation or bringing into action of bonding properties of the non-cellulose or encrusting substances of the fiber at such high temperatures.

Other means of applying heat without pressure, than the preferred mode by means of heated air as just described, may be employed, as for example, the dense boards or blanks may be immersed in a hot bath of a suitable liquid material, such as a low melting point alloy, as an alloy of lead and antimony, or mercury, or oil having a high boiling point, and yet other equivalent heat-applying procedures may be used.

After being heat-treated in any of the described modes or equivalent, the treated board is preferably humidified to some extent and cooled so that it can be handled and fire risk avoided, as by immersing in water for a short interval, or spraying with water or exposing to highly humid air.

I claim:

1. The process of making a hardboard product substantially free of surface defects and having high dry-and-wet strength of ligno-cellulose fiber furnish containing natural fiber encrustation together with cellulose, which includes the steps of applying to a moist body of such fiber pressure sufficient to consolidate same into a hardboard blank of .8 specific gravity or over at a temperature of about 315-375° F. and which is sufficiently low to avoid formation of surface defects in the blank and whereby the blank is dried substantially dry, and then subjecting such substantially dry blank to a temperature of about 425° F. or over without compacting pressure for a period of time sufficient to materially increase the dry-and-wet strength by activation of the self-bonding properties of the ligno-cellulose fiber, but not so long as to be productive of detrimental scorching.

2. The process of making a hardboard product substantially free of surface defects and having high dry-and-wet strength of ligno-cellulose fiber furnish containing natural fiber encrustation together with cellulose, which includes the steps of applying to a moist body of such fiber pressure sufficient to consolidate same into a hardboard blank of .8 specific gravity or over at a temperature of about 315-375° F. and which is sufficiently low to avoid formation of surface defects in the blank and whereby the blank is dried substantially dry, and then subjecting such substantially dry blank to a temperature of about 425-550° F. without compacting pressure for a period of time sufficient to materially increase the dry-and-wet strength by activation of the self-bonding properties of the ligno-cellulose fiber, but not so long as to be productive of detrimental scorching.

WILLIAM H. MASON.